United States Patent [19]

Tamano et al.

[11] Patent Number: 4,910,230
[45] Date of Patent: Mar. 20, 1990

[54] PREPARATION OF FINE-CELL RIGID POLYURETHANE FOAM USING AMINE CATALYST

[75] Inventors: Yutaka Tamano, Tokuyama; Shoji Arai, Shinnanyo, both of Japan

[73] Assignee: Tosoh Corporation, Yamaguchi, Japan

[21] Appl. No.: 288,238

[22] Filed: Dec. 22, 1988

[30] Foreign Application Priority Data

Dec. 25, 1987 [JP] Japan .................................. 62-327382
Jan. 26, 1988 [JP] Japan .................................. 63-13520

[51] Int. Cl.⁴ ............................................. C08G 18/14
[52] U.S. Cl. ..................................... 521/110; 521/129
[58] Field of Search ............................ 521/110, 129

[56] References Cited

U.S. PATENT DOCUMENTS 4,617,286 10/1986 Arai et al. ........................... 502/167

FOREIGN PATENT DOCUMENTS 0004309 10/1979 European Pat. Off. .
1455695 11/1976 United Kingdom .

Primary Examiner—Maurice J. Welsh
Attorney, Agent, or Firm—Nixon & Vanderhye

[57] ABSTRACT

A fine-cell rigid polyurethane foam is prepared by reacting a polyol having a blowing agent such as water incorporated therein with a polyisocyanate in the presence of an amine catalyst having a retarding effect. The amine catalyst is comprised of (a) 30 to 50 parts by weight of triethylene diamine, (b) 30 to 50 parts by weight of bis(dimethylaminoethyl)ether and/or N,N',N",N"-pentamethyldiethylene triamine, (c) up to 40 parts by weight of tetramethylhexamethylene diamine and/or trimethylaminoethylpiperazine, and (d) formic acid in an amount of 0.2 to 1.5 moles per mole of triethylene diamine.

5 Claims, No Drawings

PREPARATION OF FINE-CELL RIGID POLYURETHANE FOAM USING AMINE CATALYST

BACKGROUND OF THE INVENTION (1) Field of the Invention

The present invention relates to an amine catalyst for the preparation of a fine-cell rigid polyurethane foam. More particularly, the present invention relates to a process for the preparation of a rigid polyurethane foam having a fine-cell structure wherein a polyol containing a blowing agent and other additives is reacted with a polyisocyanate in the presence of the amine catalyst.

(2) Description of the Related Art

A rigid polyurethane foam is generally prepared by an instant mixing of a polyol containing a blowing agent such as Freon and water and a silicon foam stabilizer with a polyisocyanate, while stirring to effect blowing. The rigid polyurethane foam has a light weight and an excellent heat-insulating property, and therefore, the polyurethane foam is widely used in fields where heat insulation for maintaining a high temperature or a low temperature is necessary, for example, for construction material, boards, electric refrigerators, freezers, plants and the like.

The rigid polyurethane foam is urethane resin having closed cells. Each closed cell contains in the interior hereof Freon gas having a low thermal conductivity, a relatively small amount of carbon dioxide gas formed by reaction between the isocyanate and water at the formation of the foam, and air. This closed-cell structure imparts a high heat-insulating property to the rigid polyurethane foam. The heat-insulating property of the rigid polyurethane foam is generally expressed by the thermal conductivity called the "K-factor value", and a similar K-factor value indicates a higher heat-insulating property.

In view of the compression strength of the rigid polyurethane foam as a construction material, to reduce this K-factor value, the cell size must be small, the closed cell ratio must be high, the Freon concentration in the cells must be high and the foam density must be low.

With recent advances in research into a rigid polyurethane formulation, and in foam-forming techniques a "fine-cell rigid polyurethane technique" has been developed according to which the quantity of Freon as the blowing agent is increased while the amount of water in the formulation is reduced, and the reaction rate of the system is greatly increased, with the result that the cell size of the foam is made finer and the K-factor value is drastically reduced. Since the K-factor value can be drastically reduced by this fine-cell rigid polyurethane technique, compared with the level of the conventional technique, in fields where a heat-insulating material having a high performance, for example, for electric refrigerators, reduction of the wall thickness of a heat-insulating polyurethane material can be realized and a high energy saving effect and large capacity of refrigerators through space saving effect can be obtained by this technique.

However, the extremely high reaction rate and the reduction of the amount incorporated of water in the above-mentioned fine-cell rigid polyurethane foam system bring various disadvantages. For example, since the reaction rate of this system is extremely high, sufficient time is not allowed for mixing the polyol and isocyanate, and since the time for casting the reaction liquid is not sufficient, a reaction starts in the already cast reaction liquid and there is no substantial flowability of the reaction liquid. Accordingly, the flowability of foam is poor at the blowing reaction and an impingement face (share line) is formed between two adjacent foams, with the result that a problem of unevenness of the foam density arises. In the case of cast blowing in the mold, since the blowing reaction abruptly occurs, removal of air from a vent hole at a rate corresponding to the blowing rate becomes difficult. This is another problem. According to the conventional technique, to overcome these disadvantages, for example, at the cast blowing step in an electric refrigerator, a plurality of casting heads are adopted for casting the starting liquid, and in an extreme case, a method is adopted in which the starting liquid is cast from five casting heads. Special equipment is necessary for smoothing the removal of air from the vent hole to maintain a constant air pressure according to the blowing reaction rate of the system and not disturb the flow of foams in the system and, for example, a forced evacuation system is adopted. This drastic change of the blowing equipment or adoption of a complicated control system in the manufacturing process requires a large equipment investment and raises a barrier to a stable manufacture of high-quality products.

A reduction of the amount incorporated of water in the rigid polyurethane foam formulation results in a decrease of urea bonds formed by reaction of the isocyanate with water in the urethane-forming reaction. Accordingly, the compression strength of the foam is reduced and the dimensional stability of the foam, especially the dimensional stability at low temperatures, is degraded. Therefore, a high foam density becomes necessary for compensating the reduction of the compression strength due to the decrease of urea bonds and the above-mentioned unevenness of the density distribution, and for compensating the degradation of the dimensional stability at low temperatures. Since this high foam density results in a retardation of the curing rate of the polyurethane foam, a problem arises of an impossibility of obtaining an elevation of the manufacturing speed. As apparent from the foregoing description, the conventional fine-cell rigid polyurethane foam technique involves problems that are solved from the economical and manufacturing viewpoints.

Japanese Unexamined Patent Publication No. 54-130697, Japanese Examined Patent Publication No. 57-56491, and Japanese Unexamined Patent Publication No. 60-58418 teach that an organic carboxylic acid salt of a tertiary amine compound, such as a formic or octylic acid salt, can be used as an amine catalyst having a retarding effect for the polyurethane-forming reaction, and the foam moldability, curing speed and processability can be improved. But in these patent publications, the problems involved in the preparation of fine-cell rigid foams having a foam density of 20 to 40 kg/cm$^3$ and a cell diameter smaller than 250 $\mu$m are not discussed, and it is not suggested that the use of formic acid as an assistant and a catalyst comprising specific tertiary amine compound is valuable for solving these problems.

SUMMARY OF THE INVENTION

Under this technical background, it is a primary object of the present invention to provide a novel amine catalyst having a retarding effect, which is valuable for solving the foregoing problems involved in the preparation of fine-cell rigid urethane foams.

Another object of the present invention is to provide a process for the preparation of a fine-cell rigid polyurethane foam, which is also valuable for solving the foregoing problems.

In one aspect of the present invention, there is provided an amine catalyst for the formation of a fine-cell rigid polyurethane foam, which has a retarding effect, said amine catalyst comprising (a) 30 to 50 parts by weight of triethylene diamine, (b) 30 to 50 parts by weight of at least one compound selected from the group consisting of bis(dismethylaminoethyl)ether and N,N',N'',N'''-pentamethyldiethylene triamine, (c) 0 to 40 parts by weight of at least one compound selected from the group consisting of tetramethylhexamethylene diamine and trimethylaminoethylpiperazine, and (d) formic acid in an amount of 0.2 to 1.5 moles per mole of triethylene diamine.

In another aspect of the present invention, there is provided a process for the preparation of a fine-cell rigid polyurethane form, which comprises reacting a polyol containing a blowing agent with a polyisocyanate in the presence of the above-mentioned amine catalyst having a retarding effect.

DESCRIPTION OF THE PREFERRED EMBODIMENTS

The amine catalyst having a retarding effect according to the present invention comprises (a) 30 to 50 parts by weight of triethylene diamine, (b) 30 to 50 parts by weight of bis(dimethylaminoethyl)ether and/or N,N',N'',N'''-pentamethyldiethylene triamine, (c) up to 40 parts by weight of tetramethylhexamethylene diamine and/or trimethylaminoethylpiperazine, and (d) formic acid in an amount of 0.2 to 1.5 moles per mole of triethylene diamine.

The amount of triethylene diamine (a) is 30 to 50 parts by weight, preferably 35 to 45 parts by weight. If the amount of triethylene diamine is smaller than 30 parts by weight, the compression strength of the polyurethane foam is degraded and the K-factor value is increased. If the amount of triethylene diamine exceeds 50 parts by weight, the dimensional stability at low temperatures is degraded and the flowability of foams is reduced.

Bis(dimethylmminoethyl)ether and/or N,N,N,N'',N'''-pentamethyldiethylene triamine (b) is used in an amount of 30 to 50 parts by weight, preferably 35 to 45 parts by weight. If the amount of the component (b) is smaller than 30 parts by weight, the dimensional stability of the polyurethane foam at low temperatures and the foam flowability are degraded. If the amount of the component (b) exceeds 50 parts by weight, the K-factor value is increased and the compression strength of the polyurethane from is reduced.

The amount of tetramethylhexamethylene diamine and/or trimethylaminoethylpiperazine (c) is 0 to 40 parts by weight, preferably 10 to 30 parts by weight. If the amount of the component (c) exceeds 40 parts by weight, the stability of the catalyst liquid of the present invention is degraded and precipitation of crystals often occurs or phase separation occur, and the heat conductivity of the polyurethane foam is reduced.

The amount of formic acid (d) used in combination with the above-mentioned tertiary amine compounds is 0.2 to 1.5 moles, preferably 0.4 to 1.3 moles, per mole of triethylene diamine. If the amount of formic acid is smaller than 0.2 mole per mole of triethylene diamine, formation of fine cells is difficult and the K-factor value is increased, and the foam flowability, moldability and curing speed are reduced. If the amount of formic acid is larger than 1.5 moles per mole of triethylene diamine, the effect of reducing the cell size of the foam is not further enhanced, and the concentration of carbon dioxide gas in the cells is increased and the K-factor value is rather increased. Moreover, the pH value of the amine catalyst liquid is drastically reduced and corrosion is caused in a tank for the catalyst and the blowing equipment.

It is preferable that the amount of formic acid is from 0.05 to 0.50 part by weight per 100 parts by weight of the polyol used.

The catalyst of the present invention is present in the form of a partial formic acid salt of the mixture of the above-mentioned tertiary amine compounds (a) through (c) in the reaction system.

A know solvent for urethane catalysts is used as the solvent for the catalyst of the present invention. For example there can be mentioned ethylene glycol, diethylene glycol, propanediol, dipropylene glycol, 1,4-butanediol, 1,6-hexanediol and water. Among them, ethylene glycol, diethylene glycol, propanediol and dipropylene glycol are preferred.

The amount of the solvent added is not particularly limited, but it is generally preferred that the solvent be added in an amount 0.3 to 3 times the amount of the mixture of the tertiary amine compounds containing formic acid. If the amount of the solvent is more than 3 times the amount of the amine mixture, adverse affects are imposed on the physical properties of the polyurethane foam, and furthermore, use of too large an amount of the solvent is not preferred from the economical viewpoint. The amine catalyst having a retarding effect according to the present invention can be easily prepared according to the customary method in which the solvent is added to th above-mentioned tertiary amines and then, formic acid is added to the mixture. Alternatively, formic acid may be premixed with the polyol used.

The so-obtained amine catalyst of the present invention can be used as the catalyst for a system liquid for formation of a fine-cell rigid polyurethane foam. The catalyst of the present invention is used in an amount of 0.02 to 10 parts by weight, preferably 0.05 to 7 parts by weight, per 100 parts by weight of the polyol used for the formation of the polyurethane foam.

A known tertiary amine catalyst or organic tin compound customarily used as a co-catalyst can be appropriately used, so far as the catalytic performance of the catalyst of the present invention is not degraded. For example, there can be mentioned tertiary amine compounds such as triethylamine, dimethylcyclohexylamine, dimethylbenzylamine, dicyclohexylmethylamine, tetramethylethylene diamine, tetramethylpropane-diamine, bis(dimethylaminopropyl)-methylamine, bis(dimethylaminopropyl)amine, tetramethylguanidine, dimethylpiperazine, methylmorpholine, ethylmorpholine, dimethylaminoethylmorpholine, dimethylethanolamine, dimethylaminoethoxyethanol, trimethylaminoethylethanolamine and DBU, and organic tin compounds such as stannous dioctoate, dibutyltin dilaurate, dibutyltin diacetate, dibutyltin dioctoate, dimethyltin dilaurate and dimethyltin octoate.

A known polyether polyol can be used as the polyol for preparing a fine-cell rigid polyurethane foam by using the catalyst of the present invention. More specifically, there can be used polyether polyols obtained by adding ethylene oxide or propylene oxide to an ordinary polyhydric alcohol such as glycol, glycerol, bisphenol, pentaerythritol, trimethylolpropane or sucrose, ammonia, an aliphatic amine compound such as ethylene amine, an aromatic amine compound such as toluene diamine or diphenylmethane-4,4'-diamine, or a mixture thereof. A polyether polyol comprising 40 to 60% by weight of an aromatic diamine polyether, such as an aromatic polyether polyol derived from toluene diamine, and having an average hydroxyl value of 400 to 500 is especially preferred.

Known blowing agents such as halomethanes and haloethanes can be used as the blowing agent, and trichlorofluoromethane and water are preferred. Water is used in an amount of up to 1.0 part by weight, preferably 0.1 to 0.8 part by weight, per 100 parts by weight of the polyol. If the amount used of water exceeds 1.0 part by weight, the concentration of carbon dioxide gas in cells is increased and the K-factor value is increased.

A known silicon foam stabilizer customarily used for a rigid urethane foam may be used as a surface active agent. The amount of the foam stabilizer is usually 1.5 to 2.5 parts by weight per 100 parts by weight of the polyol.

A polyol premix liquid comprising a polyol as the main starting material and additives as described above can be prepared according to a customary method as described below. For example, a predetermined amount of the polyether polyol is charged in a mixing tank provided with a stirrer, and predetermined amounts of the amines, water as the blowing agent, the silicon surface active agent and, if desired, formic acid are added to the polyether polyol. Then, a predetermined amount of Freon as the blowing agent is further added. The so-obtained polyol premix liquid can be used for the production of a fine-cell rigid urethane foam according to the present invention. It is believed that, if formic acid is incorporated in the polyol premix liquid, added formic acid forms formic acid salts with the amines of the amine catalyst of the present invention. Accordingly, at the initial stage of the polyurethane-forming reaction, the amine compounds form salts with formic acid and therefore, the reactivity is low. With advance of the reaction, the formic acid salts are dissociated and an inherent strong activity of the amine compounds is manifested. Thus, a desirable subsidiary effect, that is, a retarding catalytic effect, can be attained. Therefore, the foam flowability and moldability of the system liquid are improved, and moreover, the curing rate is increased.

Any known organic polyisocyanates can be used as the polyisocyanate for preparing a fine-cell rigid polyurethane foam. For example, there can be mentioned toluene diisocyanate, diphenylmethane-4,4'-diisocyanate, polymerized isocyanates thereof, a toluene diisocyanate prepolymer, a diphenylmethane-4,4'-diisocyanate prepolymer, and mixtures thereof. A toluene diisocyanate prepolymer, diphenylmethane-4,4'-diisocyanate and a mixture of polymerized isocyanates are preferred.

A fine-cell rigid polyurethane foam prepared from the above-mentioned polyol premix liquid and the polyisocyanate according to the present invention has a density of 20 to 40 kg/m³ and an average cell diameter smaller than 250μm.

The present invention will now be described in detail with respective to the following examples, that by no means limit the scope of the invention.

EXAMPLES 1 THROUGH 4 AND COMPARATIVE EXAMPLES 1 THROUGH 6

Preparation of Catalyst

A 500 ml-capacity round-bottom glass flask equipped with a stirrer was charged with respective catalyst components, formic acid and ethylene glycol as the solvent in a nitrogen atmosphere so as to obtain a predetermined catalyst composition (% by weight), whereby a homogeneous catalyst liquid as prepared. The composition of the catalyst is shown in Table 1.

Abbreviations in Table 1 are as follows.

| | |
|---|---|
| TEDA: | triethylene diamine (TEDA supplied by TOSOH Corp.) |
| TMNAEP: | trimethylaminoethylpiperazine (TOYOCAT-NP supplied by TOSOH Corp.) |
| TMHMDA: | Tetramethylhexamethylene diamine (TOYOCAT-MR supplied by TOSOH Corp. |
| PMDETA: | N,N,N,',N'',N''—pentamethyldiethylene triamine (TOYOCAT-DT supplied by TOSOH Corp.) |
| TMHMDA: | tetramethylhexamethylene diamine (TOYOCAT-MR supplied by TOSOH Corp.) |
| BDMEE: | bis-(2-dimethylaminoethyl)ether (TOYOCAT-ETS supplied by TOSOH Corp.) |

Blowing Test

With respect to each of catalysts of Examples 1 through 4 and Comparative Examples 1 through 6, the blowing test was carried out at the mixing ratio (formulation) in the starting material, shown below, under the blowing conditions shown below.

| | (parts by weight) |
|---|---|
| (a) Formulation | |
| Polyol[(1)] | 100 |
| Water | 0.5 |
| Foam stabilizer[(2)] | 2.0 |
| Blowing agent[(3)] | 46.0 |
| Catalyst | predetermine amount (shown in Table (1) |
| Isocyanate[(4)] | 130.0 (NCO/OH = 1.05) |
| (b) Blowing Conditions | |
| Starting material temperature: | 20 ± 1° C. |
| Stirring speed: | 6000 rpm (5 seconds) |
| Mold temperature: | 50° C. |

Note
[(1)]Aromatic amine type polyol having an OH value of 465 mgKOH/g (Actocol GR-46 supplied by Takeda Chemical)
[(2)]Silicone surface active agent (L-5340 supplied by Nippon Unicar)
[(3)]Trichlorofluoromethane (R-11 supplied by Mitsui Fluorochemical)
[(4)]Crude MDI/TDI prepolymer having an NCO concentration of 30.0% (Takenate RL-26P-5 supplied by Takeda Chemical)

Measurement Items at Free Blowing

Blowing was effected in an aluminum box having a size of 25 cm×25 cm×25 cm, and the measurement was carried out with respect to the following items. The results are shown in Table 1.

(a) Reactivity

| (a) Reactivity | |
|---|---|
| Cream time | time (seconds) required for rising of the foam |
| Gel time | time (seconds) required for resinification (cobwebbing) |
| Tack-free time | time (seconds) required for disappearance of tackiness on |

-continued

| | (a) Reactivity |
|---|---|
| Rise time | the foam surface time (seconds) required for stopping of rising of the foam |

(b) Density of Free Foam

A test piece having a size of 20 cm×20 cm×2.5 cm was cut from the central portion of the foam obtained by free blowing, and the density of this test piece was measured.

(c) Cell Diameter of Foam

A test piece was cut from the central portion of the foam, and the cell diameter was measured under a transmission type microscope.

(d) Thermal Conductivity

A test piece having a size of 20 cm×20 cm×2.5 cm was cut from the central portion of the foam, and the thermal conductivity of this test piece was measured by ANACON Model 88.

(e) Curing Time

The hardness of the upper portion of the foam obtained by free blowing was measured by a Shore-C hardness meter, and the time (minutes) required for attaining a hardness of 50 was designated as the curing time.

Measurement Items at Mold Blowing

Blowing was carried out at a pack ratio of 120% by using a longitudinal aluminum mold having a size of 50 cm×50 cm×4.5 cm, and the measurement was carried out with respect to the following items. The results are shown in Table 1.

(a) Dimensional Stability at Low Temperatures

The change ratio in the thickness direction was measured under conditions of −30° C.×48 hours.

(b) Compression Strength

The 10% compression strength in the thickness direction was measured.

(c) Flowability

A predetermined amount of the starting mixture liquid was cast in an aluminum mold having a length of 100 cm, a width of 25 cm and a thickness of 3.0 cm, and the length (cm) of the formed foam was measured.

TABLE 1

| | Example No. | | | | Comparative Example No. | | | | | |
|---|---|---|---|---|---|---|---|---|---|---|
| | 1 | 2 | 3 | 4 | 1 | 2 | 3 | 4 | 5 | 6 |
| Catalyst composition (wt. %) | | | | | | | | | | |
| TEDA | 25.0 | 25.0 | 19.5 | 19.5 | 33.3 | 33.3 | 12.5 | 30.0 | 4.0 | 22.8 |
| TMNAEP | | | 17.0 | | | | | 25.0 | | |
| TMHMDA | | | | 15.0 | | | 37.5 | | | |
| PMDETA | 25.0 | | | | | | | 4.0 | 46.0 | |
| BDMEE | | 25.0 | 17.0 | 15.0 | | | | | | 22.8 |
| Formic acid | 6.0 | 6.0 | 8.0 | 8.0 | | | | 6.0 | 6.0 | 18.7 |
| Ethylene glycol | 44.0 | 44.0 | 38.5 | 42.5 | 66.7 | 66.7 | 25.0 | 60.0 | 44.0 | 35.8 |
| Blowing test | | | | | | | | | | |
| Amount of catalyst (wt. parts) | 2.90 | 2.99 | 3.20 | 3.16 | 2.05 | 4.00 | 4.00 | 3.25 | 5.54 | 3.37 |
| Reactivity (seconds) | | | | | | | | | | |
| Cream time | 8 | 8 | 9 | 9 | 11 | 7 | 5 | 9 | 5 | 9 |
| Gel time | 51 | 52 | 50 | 50 | 64 | 37 | 39 | 49 | 50 | 51 |
| Tack-free time | 54 | 55 | 54 | 54 | 68 | 40 | 42 | 54 | 57 | 58 |
| Rise time | 101 | 100 | 100 | 98 | 128 | 84 | 87 | 101 | 99 | 97 |
| Density of foam by free blowing (kg/m$^3$) | 24.0 | 24.0 | 23.8 | 23.9 | 24.5 | 24.1 | 24.0 | 24.2 | 24.0 | 23.6 |
| Cell diameter of form (μm) | 230 | 232 | 231 | 232 | 320 | 225 | 229 | 231 | 230 | 230 |
| Thermal conductivity (kcal/mh °C.) | 0.0122 | 0.0123 | 0.0123 | 0.0122 | 0.0130 | 0.0121 | 0.0123 | 0.0122 | 0.0124 | 0.0128 |
| Dimensional stability at low temperature (%) | −0.3 | −0.2 | −0.4 | −0.7 | −4.2 | −3.9 | −2.3 | −4.0 | −0.3 | −0.6 |
| Flowability (cm) | 82 | 81 | 80 | 80 | 75 | 73 | 77 | 76 | 81 | 82 |
| Compression strength (kg/cm$^2$) | 1.4 | 1.4 | 1.5 | 1.5 | 1.5 | 1.6 | 1.4 | 1.5 | 1.2 | 1.4 |
| Curing time (min) | 4.5 | 4.7 | 4.4 | 4.5 | 6.1 | 4.4 | 4.6 | 4.7 | 5.0 | 4.4 |

EXAMPLES 5 THROUGH 8 AND COMPARATIVE EXAMPLES 7 THROUGH 10

Following the same procedures as those described in Examples 1 through 4, blowing tests were carried out wherein the formic acid was premixed with the polyol instead of the tertiary amine compounds. With other conditions remained substantially the same. The results are shown in Table 2.

TABLE 2

| | Example No. | | | | Comparative Example No. | | | | | | |
|---|---|---|---|---|---|---|---|---|---|---|---|
| | 5 | 6 | 7 | 8 | 7 | 8 | 9 | 10 | 1 | 2 | 3 |
| Formic acid (wt. parts) | 0.18 | 0.18 | 0.40 | 0.40 | 0 | 0.80 | 0.18 | 0.18 | 0 | 0 | 0 |
| Catalyst (wt. %) | | | | | | | | | | | |
| TEDA | 26.6 | 26.6 | 21.2 | 21.2 | 26.6 | 26.6 | 31.9 | 4.3 | 33.3 | 33.3 | 12.5 |
| TMNAEP | | | | 18.5 | | | | | | | 25.0 |
| TMHMDA | | | | 16.3 | | | | | | | 37.5 |

TABLE 2-continued

| | Example No. | | | | Comparative Example No. | | | | | | |
|---|---|---|---|---|---|---|---|---|---|---|---|
| | 5 | 6 | 7 | 8 | 7 | 8 | 9 | 10 | 11 | 12 | 13 |
| PMDETA | 26.6 | | | | 26.6 | 26.6 | 4.3 | 48.9 | | | |
| BDMEE | | 26.6 | 18.5 | 16.3 | | | | | | | |
| Ethylene glycol | 46.8 | 46.8 | 41.8 | 46.2 | 46.8 | 46.8 | 63.8 | 46.8 | 66.7 | 66.7 | 25.0 |
| Amount of catalyst (wt. parts) | 2.73 | 2.81 | 2.98 | 2.96 | 2.55 | 2.92 | 3.06 | 5.21 | 2.05 | 4.00 | 4.00 |
| Blowing test | | | | | | | | | | | |
| *Reactivity (seconds)* | | | | | | | | | | | |
| Cream time | 8 | 8 | 9 | 9 | 7 | 9 | 9 | 5 | 11 | 7 | 5 |
| Gel time | 51 | 52 | 50 | 50 | 49 | 50 | 49 | 50 | 64 | 37 | 39 |
| Tack-free time | 54 | 55 | 54 | 54 | 54 | 54 | 54 | 57 | 68 | 40 | 42 |
| Rise time | 101 | 100 | 100 | 98 | 100 | 99 | 101 | 99 | 128 | 84 | 87 |
| Density of foam by free blowing (kg/m$^3$) | 24.0 | 24.0 | 23.8 | 23.9 | 24.1 | 23.6 | 24.2 | 24.0 | 24.5 | 24.1 | 24.0 |
| Cell diameter of foam ($\mu$m) | 230 | 232 | 231 | 232 | 276 | 230 | 231 | 230 | 320 | 225 | 229 |
| Thermal conductivity (kcal/mh °C.) | 0.0122 | 0.0123 | 0.0123 | 0.0122 | 0.0127 | 0.0128 | 0.0122 | 0.0124 | 0.0130 | 0.0121 | 0.0123 |
| Dimensional stability at low temperature (%) | −0.3 | −0.2 | −0.4 | −0.7 | −0.4 | −0.6 | −4.0 | −0.3 | −4.2 | −3.9 | −2.3 |
| Flowability (cm) | 82 | 81 | 80 | 80 | 80 | 82 | 76 | 81 | 75 | 73 | 77 |
| Compression strength (kg/cm$^2$) | 1.4 | 1.4 | 1.5 | 1.5 | 1.4 | 1.4 | 1.5 | 1.2 | 1.5 | 1.6 | 1.4 |
| Curing time (min) | 4.5 | 4.7 | 4.4 | 4.5 | 5.1 | 4.4 | 4.7 | 5.0 | 6.1 | 4.4 | 4.6 |

As apparent from the foregoing description, according to the present invention, by using formic in combination with an amine catalyst comprising the above-mentioned tertiary amine compounds the problems involved in the conventional fine-cell rigid polyurethane foam techniques can be solved, and the necessity of drastic changes of the blowing equipment and adoption of a complicated control system can be moderated. More specifically, by using formic acid, a fine-cell rigid polyurethane foam having a small cell size and a small K-factor value can be obtained.

Moreover, the formic acid added forms salts with the tertiary amine compounds in the catalyst of the present invention. Accordingly, the characteristic of an amine catalyst having a retarding effect is manifested. More specifically, the reaction activity is low at the initial stage of reaction, but at the latter stage where the temperature is elevated, a high reaction activity is manifested. This characteristic is effective for improving the liquid flowability and foam flowability, and closed cells having a reduced distortion can be formed by dint of this characteristics. Moreover, since a high catalytic activity is manifested at the latter stage of the foam-forming reaction, it becomes possible to enhance the curing rate of the foam and therefore, the productivity can be increased.

Moreover, since the reaction rate of the system is slow, a sufficient time can be taken for mixing a polyol with an isocyanate and initiation of the reaction of the reaction liquid can be prevented during the course of casting the reaction liquid. Therefore, a good flow of the reaction liquid is attained and the foam flow is improved at the blowing reaction, with the result that an impingement face is rarely formed between two adjacent foams and the foam density is uniformalized. Accordingly, casting can be accomplished very easily without an extreme increase of the number of casting heads at the casting and blowing step, as observed in the conventional technique.

Still further, since a strong catalytic activity is manifested at the latter stage of the foam-foaming reaction, the curing rate of the foam can be increased, and therefore, the productivity can be improved.

Further, the rate of blowing by the catalyst of the present invention is slow and air is sufficiently removed from a vent hole according to the blowing rate. Accordingly, special equipment such as a forced evacuation system is not necessary.

We claim:

1. A process for the preparation of a fine-cell rigid polyurethane foam, which comprises reacting a polyol having a blowing agent incorporated therein with a polyisocyanate in the presence of an amine catalyst having a retarding effect, said amine catalyst comprising (a) 30 to 50 parts by weight of triethylene diamine, (b) 30 to 50 parts by weigh of at least one compound selected from the group consisting of bis(dimethylaminoethyl)ether and N,N',N'',N'',-pentamethyl-diethylene triamine, (c) up to 4 parts by weight of at least one compound selected from the group consisting of tetramethylhexamethylene diamine and trimethylaminoethylpiperazine, and (d) formic acid in an amount of 0.2 to 1.5 moles per mole of triethylene diamine.

2. The process according to claim 1, wherein the polyol is a polyether polyol comprising 40 to 60% by weight of an aromatic diamine polyether and having an average hydroxyl value of 400 to 500.

3. The process according to claim 1, wherein the polyol contains up to 1.0 part by weight, per 100 parts by weight of the polyol, of water as the blowing agent.

4. The process according to claim 1, wherein the polyol further contains 1.5 to 2.5 parts by weight, per 100 parts by weight of the polyol, of a silicon foam stabilizer.

5. The process according to claim 1, wherein the polyisocyanate is a toluene diisocyanate prepolymer, diphenylmethane-4,4'-diisocyanate or a mixture of polymerized isocyanates.

* * * * *